United States Patent
Spanier et al.

(10) Patent No.: US 12,476,825 B2
(45) Date of Patent: *Nov. 18, 2025

(54) DIGITAL SIGNATURE SECURITY SYSTEM FOR MESSAGES

(71) Applicant: NAGRAVISION SARL, Cheseaux-sur-Lausanne (CH)

(72) Inventors: Ryan Spanier, Atlanta, GA (US); Nathan Hamiel, Jacksonville, FL (US); Nils Amiet, Fétigny (CH); Joshua Roys, Atlanta, GA (US)

(73) Assignee: NAGRAVISION SARL, Cheseaux-sur-Lausanne (CH)

( * ) Notice: Subject to any disclaimer, the term of this patent is extended or adjusted under 35 U.S.C. 154(b) by 18 days.

This patent is subject to a terminal disclaimer.

(21) Appl. No.: 18/033,611

(22) PCT Filed: Nov. 3, 2021

(86) PCT No.: PCT/IB2021/060183
§ 371 (c)(1),
(2) Date: Apr. 25, 2023

(87) PCT Pub. No.: WO2022/097044
PCT Pub. Date: May 12, 2022

(65) Prior Publication Data
US 2024/0022432 A1 Jan. 18, 2024

Related U.S. Application Data

(60) Provisional application No. 63/110,843, filed on Nov. 6, 2020.

(51) Int. Cl.
*H04L 9/32* (2006.01)
*H04L 9/08* (2006.01)

(52) U.S. Cl.
CPC .......... *H04L 9/3249* (2013.01); *H04L 9/0825* (2013.01); *H04L 9/3297* (2013.01)

(58) Field of Classification Search
CPC .... H04L 9/3249; H04L 9/0825; H04L 9/3297
(Continued)

(56) References Cited

U.S. PATENT DOCUMENTS 6,732,101 B1 * 5/2004 Cook ............... H04L 63/123
380/255
6,952,773 B2 * 10/2005 Wheeler ............ G06Q 20/02
713/157

(Continued)

FOREIGN PATENT DOCUMENTS

WO WO-2013013262 A1 * 1/2013 ............ G06F 21/42

OTHER PUBLICATIONS

Scott Campbell, "Supporting Digital Signatures in Mobile Environments" Department of Computer Science and Systems Analysis, Miami University, IEEE 2003 (Year: 2003).*

*Primary Examiner* — Samson B Lemma
(74) *Attorney, Agent, or Firm* — POLSINELLI LLP

(57) ABSTRACT

Systems and techniques are described herein for validating one or more requests. For example, the systems and techniques can include receiving message data from a first device accessible to a user. The message data can be associated with a message to be sent using the first device. The systems and techniques can also include sending, to a second device accessible to the user, a request for confirmation that the user requested a digital signature for the message, the first device and second device being different devices. The systems and techniques can further include receiving a confirmation from the second device, the confirmation confirming that the user requested the digital signature for the message. The systems and techniques can further include generating the digital signature for the mes- (Continued)

sage using the message data and a private key and sending the digital signature to the first device.

17 Claims, 9 Drawing Sheets

(58) Field of Classification Search
USPC .......................................................... 713/168
See application file for complete search history.

(56) References Cited

U.S. PATENT DOCUMENTS

| | | | | |
|---|---|---|---|---|
| 7,200,749 | B2* | 4/2007 | Wheeler | H04L 9/321 |
| | | | | 713/176 |
| 7,725,723 | B2* | 5/2010 | Landrock | H04L 63/0823 |
| | | | | 713/176 |
| 9,065,842 | B2* | 6/2015 | Vandervort | H04L 9/3247 |
| 9,419,950 | B2* | 8/2016 | Cook | H04L 63/126 |
| 2003/0115463 | A1* | 6/2003 | Wheeler | G07F 7/0886 |
| | | | | 713/170 |
| 2003/0140252 | A1* | 7/2003 | Lafon | H04L 9/006 |
| | | | | 726/10 |
| 2003/0177361 | A1* | 9/2003 | Wheeler | G06Q 20/00 |
| | | | | 713/176 |
| 2004/0025057 | A1* | 2/2004 | Cook | H04L 63/123 |
| | | | | 726/28 |
| 2007/0088950 | A1* | 4/2007 | Wheeler | G06Q 20/0855 |
| | | | | 713/170 |
| 2008/0100874 | A1* | 5/2008 | Mayer | H04L 9/3271 |
| | | | | 358/403 |
| 2009/0150675 | A1* | 6/2009 | Cook | H04L 63/0442 |
| | | | | 713/168 |
| 2009/0198997 | A1* | 8/2009 | Yeap | H04L 51/48 |
| | | | | 380/282 |
| 2013/0166914 | A1* | 6/2013 | Vandervort | H04L 63/123 |
| | | | | 713/176 |
| 2013/0275762 | A1* | 10/2013 | Tomkow | H04L 63/0471 |
| | | | | 713/176 |
| 2018/0041333 | A1* | 2/2018 | Forget | H04L 63/0853 |
| 2019/0052461 | A1* | 2/2019 | Kreder, III | G06F 21/75 |

* cited by examiner

DIGITAL SIGNATURE SECURITY SYSTEM FOR MESSAGES

CROSS-REFERENCES TO RELATED APPLICATIONS

This application is a U.S. National Stage of PCT Application No. PCT/IB2021/060183, filed Nov. 3, 2021, which claims priority to U.S. Provisional Application No. 63/110,843, filed Nov. 6, 2020, the entire contents of each of which are incorporated herein by reference in their entirety for all purposes.

FIELD

The present disclosure is related to providing security for messages. Some aspects described herein are related to systems and techniques for generating a digital signature for a message to verify an authenticity of the message.

BACKGROUND

In general, an electronic messaging system, such as those that send and receive emails, requires a user to authenticate their identity by logging into the system. Once authenticated, the user can send messages. In some cases, when a message is displayed on a recipient's device, the message may include one or more indications of the identity of the user. For example, many email systems display the email address of the sender, a username of the sender, a photo or title associated with the sender, among other information. However, displaying an email address, username, photo, title, etc. does not verify the identity of the sender or ensure that the sender is who they say they are.

In some cases, a recipient may receive a message that is purportedly from a certain user or entity, when in fact the user or entity's account has been misappropriated by a malicious actor. The malicious actor can then request sensitive information while masquerading as the user or entity associated with the account. In such cases, a recipient who receives the request for sensitive information may provide the information without knowing that it will be received by the malicious actor. Systems and techniques are needed to provide greater security for messages.

SUMMARY

Systems and techniques are described herein for providing verified messages to users of a messaging system. For example, a user can provide input to a user device (also referred to herein as a primary device) requesting that a digital signature is added to a message (e.g., an email or other message). Once the message is signed using the digital signature, the digital signature can be used by a recipient device to verify that the user requested the digital signature be added to the message to be sent.

In one example, a method of validating one or more requests is provided. The method includes receiving message data from a first device accessible to a user. The message data is associated with a message to be sent using the first device. The method includes sending, to a second device accessible to the user, a request for confirmation that the user requested a digital signature for the message, the first device and second device being different devices. The method includes receiving a confirmation from the second device, the confirmation confirming that the user requested the digital signature for the message. The method includes generating the digital signature for the message using the message data and a private key and sending the digital signature to the first device.

In another example, a computer-readable storage medium storing instructions that, when executed, cause one or more processors to perform operations is provided. The operations include receiving message data from a first device accessible to a user. The message data is associated with a message to be sent using the first device. The operations include sending, to a second device accessible to the user, a request for confirmation that the user requested a digital signature for the message, the first device and second device being different devices. The operations include receiving a confirmation from the second device, the confirmation confirming that the user requested the digital signature for the message. The operations include generating the digital signature for the message using the message data and a private key and sending the digital signature to the first device.

In another example, an apparatus for validating one or more requests is provided. The apparatus comprises one or more processors and one or more non-transitory machine-readable storage media containing instructions which when executed on the one or more processors, cause the one or more processors to perform operations. The operations include receiving message data from a first device accessible to a user. The message data is associated with a message to be sent using the first device. The operations include sending, to a second device accessible to the user, a request for confirmation that the user requested a digital signature for the message, the first device and second device being different devices. The operations include receiving a confirmation from the second device, the confirmation confirming that the user requested the digital signature for the message. The operations include generating the digital signature for the message using the message data and a private key and sending the digital signature to the first device.

In some aspects the request for confirmation includes information associated with the message. The information associated with the message can include at least one of a timestamp corresponding to a time associated with sending of the message, a portion of text included in the message, and an intended recipient of the message.

In some aspects, the private key is an asymmetric private key.

In some aspects, generating the digital signature is performed using a Rivest-Shamir-Adleman (RSA) algorithm.

In some aspects, the message data includes a hash of the message.

In some aspects, the message is an email. The first device can be communicatively coupled to an email messaging system.

In some aspects, the methods, apparatuses, and computer-readable medium described above further comprise: receiving additional message data from the first device, the additional message data being associated with an additional message to be sent using the first device. The methods, apparatuses, and computer-readable medium described above further comprise: sending, to the second device accessible to the user, an additional request for confirmation that the user requested an additional digital signature for the additional message. The methods, apparatuses, and computer-readable medium described above further comprise: receiving, from the second device, an indication that the user did not authorize the additional message. The methods, apparatuses, and computer-readable medium described above further comprise: in response to receiving the indication that the user did not authorize the additional message, not generating an additional digital signature for the additional message.

In some aspects, the methods, apparatuses, and computer-readable medium described above further comprise: signing the message data using the private key and sending the signed message data to the first device.

In another example, a method of validating one or more requests is provided. The method includes sending, by a first device, first message data to a server, the first message data being associated with a first message to be sent by the first device to a recipient device. The method includes receiving, by the first device from the server, a first digital signature for the first message. The message includes associating the first digital signature to the first message. The method includes addressing, by the first device, the first message and the first digital signature to the recipient device.

In another example, a computer-readable storage medium storing instructions that, when executed, cause one or more processors to perform operations is provided. The operations include sending, by a first device, first message data to a server, the first message data being associated with a first message to be sent by the first device to a recipient device. The operations include receiving, by the first device from the server, a first digital signature for the first message. The operations include associating the first digital signature to the first message. The operations include addressing, by the first device, the first message and the first digital signature to the recipient device.

In another example, an apparatus for validating one or more requests is provided. The apparatus comprises one or more processors and one or more non-transitory machine-readable storage media containing instructions which when executed on the one or more processors, cause the one or more processors to perform operations. The operations include sending, by a first device, first message data to a server, the first message data being associated with a first message to be sent by the first device to a recipient device. The operations include receiving, by the first device from the server, a first digital signature for the first message. The operations include associating the first digital signature to the first message. The operations include addressing, by the first device, the first message and the first digital signature to the recipient device.

In some aspects, the first digital signature is generated using the first message data and a private key for the server.

In some aspects, the first message data includes a hash of the first message.

In some aspects, the first message is an email.

In some aspects, the methods, apparatuses, and computer-readable medium described above further comprise: receiving, from a sender device, a second message that includes a second digital signature, the second message being associated with second message data. The methods, apparatuses, and computer-readable medium further comprise: determining whether the second digital signature is valid using a public key for the server.

In some aspects, the methods, apparatuses, and computer-readable medium described above further comprise: determining that the second digital signature is valid using the public key. The methods, apparatuses, and computer-readable medium further comprise: in response to determining that the second digital signature is valid, generating an indication that the second digital signature is valid and outputting the indication.

In some aspects, outputting the indication includes displaying the indication.

In some aspects, the methods, apparatuses, and computer-readable medium described above further comprise: determining that the second digital signature is not valid using the public key. The methods, apparatuses, and computer-readable medium further comprise: in response to determining that the second digital signature is not valid, generating an indication that the second digital signature is not valid and outputting the indication.

In some aspects, outputting the indication includes displaying the indication.

In some aspects, the second digital signature is generated using the second message data and a private key for the server.

In some aspects, the apparatuses described above can be can be part of a computing device, such as a server computer, a mobile device, a set-top box, a personal computer, a laptop computer, a tablet computer, a television, a virtual reality (VR) device, an augmented reality (AR) device, a mixed reality (MR) device, a wearable device, and/or other device. In some aspects, the apparatus further includes a display for displaying one or more images, notifications, and/or other displayable data.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures.

DETAILED DESCRIPTION

Figure 1A:
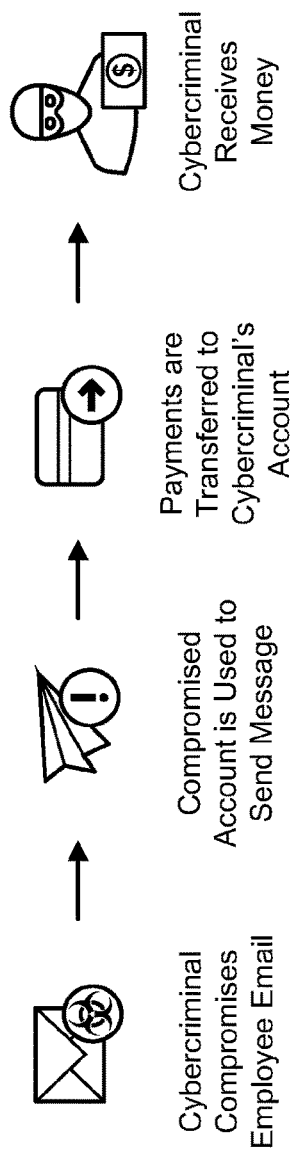
FIGS. 1A-1C are diagrams illustrating examples of cyber-attacks to which conventional messaging systems are vulnerable.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Various types of messaging systems can provide messaging services for users. Examples of messaging systems include email messaging systems, text messaging systems (e.g., short messaging service or SMS messages), application-based messaging systems (e.g., messaging using a computer or mobile application), among others. A messaging system (e.g., an email messaging system) can provide a messaging user interface that can be operated by and displayed by a user device. The messaging user interface can allow a user to provide input to cause the user device to compose a message, select a recipient (a receiving user) of the message, and send the message to a recipient device of the recipient.

In some cases, a message (e.g., text and/or media included in a subject line or body of the message) can include sensitive information and/or requests for sensitive information directed to a recipient of the message. The message may also include identifying information associated with the user and/or an account of the user, such as an email address, a username, and/or other information. Based on the identifying information, the recipient can determine a user account that is associated with the sender of the message (e.g., by viewing the email address or username associated with the received message). However, while the recipient may recognize the user account or the name of the individual associated with the user account based on the identifying information, the recipient is not able to verify that the message (and any sensitive information and/or requests included in the message) was in fact authorized to be sent with a digital signature by the individual associated with the user account.

As described in more detail below, systems and techniques are described herein for generating digital signatures for messages sent to a recipient device. In some examples, a security system (e.g., including one or more security systems) can receive a request for the digital signature from a primary device that is accessible to a user. In some examples, a user interface for a messaging system can include an option to request that a security system generate a digital signature to be sent along with a message.

In response to receiving a request for a digital signature from the primary device running the user interface, the security system can send to a secondary device a request for confirmation that the user requested the digital signature. The secondary device can receive a verification message requesting the user confirm that they requested the digital signature. In some examples, the user can use the primary device (e.g., a desktop computer of the user) to construct the message, and the security system can send the verification message to a secondary device of the user (e.g., a smartphone of the user) that is a different device than the primary device. The verification message can include details of the message and request that the user confirm the user requested a digital signature for the message.

The user can confirm or deny that they requested the digital signature for the message by providing input using the primary device or the secondary device. If the user denies that they requested the digital signature for the message, the security system does not generate a digital signature for the message. In some implementations, if the user denies that they requested the digital signature, then the security system can generate an empty signature (e.g., a null value for the signature). In some cases, the security system can send the empty signature to the primary device associated with the secondary device. Receiving an empty signature from the security system can alert the primary device that a request submitted by a user of the primary device for a digital signature failed and that the message should not be sent. In the event the user did not request a digital signature, the empty signature can alert the user that a fraudulent message was attempted from the user's primary device and, in some cases, the primary device (e.g., a user interface of the primary device) can prevent the fraudulent message from being sent. In some implementations, the primary device (e.g., using a user interface of the primary device) displays an error message in response to receiving the empty signature. However, if the primary or secondary device receives input that confirms the user requested the digital signature for the message, the primary or secondary device can send a confirmation or acknowledgement message to the security system.

Upon receiving a confirmation message, the security system can generate a digital signature for the message using a private key (e.g., an asymmetric private key having a corresponding public key) and message data (e.g., a hash of the message). The security system can sign the message using the private key and can send the signed message to the primary device.

The primary device can send the signed message to the recipient device (e.g., the primary device can send the signed message to a messaging system, which sends the message to the recipient device). The recipient device can verify that the message was authorized to be sent with a digital signature by verifying the digital signature (e.g., using the security system's public key). Along with the message itself, the recipient device can display (for viewing by a recipient) a visual indication that the message was authorized to be sent with the digital signature following verification of the digital signature by the recipient device. The visual indication allows the recipient to verify that the message was sent by the individual associated with the displayed username, rather than a cybercriminal posing as the individual. In some examples, in addition to or as an alternative to the visual indication coded information (e.g., a barcode, such as a quick response (QR) code) can be embedded or otherwise included with a message. The coded information can be scanned by the recipient device or by another device (e.g., a mobile device) of the recipient to verify with a server that the message was authorized to be sent with the digital signature by the particular individual. The recipient device can be granted access to the email and display the content of the email upon verification by the server based on the scanned coded information.

The techniques described herein can be used to achieve several advantages as compared to existing messaging systems. For example, a recipient device is able to verify that a user requested a digital signature for a message received from a sender device. The recipient need not perform any additional steps to verify the message since a user interface that displays the message also displays whether the message has been verified or not. As another example, because the recipient device can verify the digital signature locally (e.g., without contacting a third-party), the privacy of the recipient device is preserved while the device performs the message verification. For example, details including when or which device is used to display the message can be maintained by the recipient device without these details being disclosed to any additional devices.

Figure 1B:
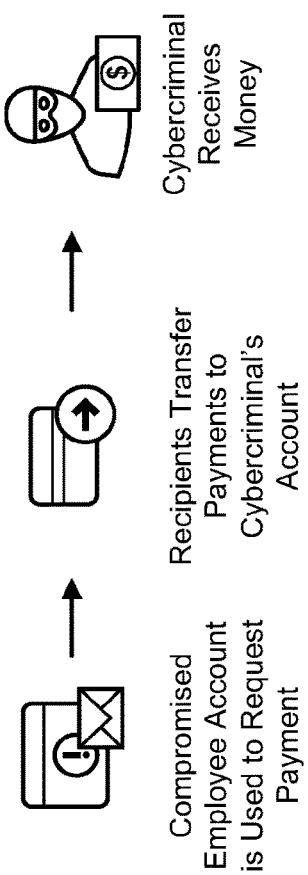
Figure 1C:
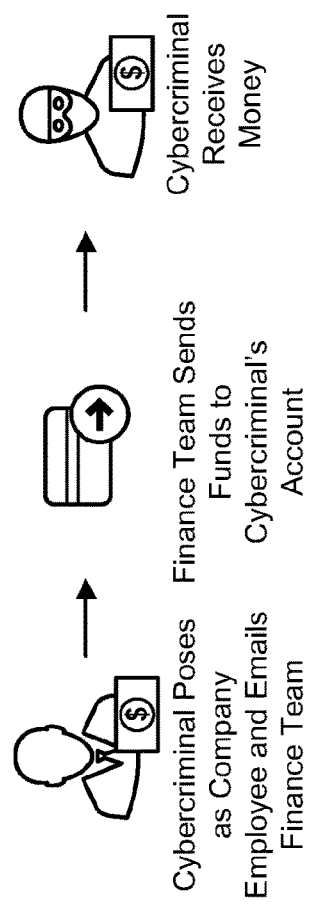

Various aspects of the techniques described herein will be discussed below with respect to the figures. While the descriptions of some of the figures reference messaging systems or servers configured to send and receive emails, in general, the messaging systems described herein can be systems that send any type of electronic message, such as text messages (SMS, EMS, MMS) or instant messages (IMs). FIGS. 1A-1C are block diagrams illustrating examples of cyberattacks that modern messaging systems are vulnerable to.

FIG. 1A is a diagram illustrating an example of a cyberattack in which a cybercriminal compromises an email account of a user. For example, a cybercriminal can compromise an account of a particular user by fraudulently gaining access to the account such that the cybercriminal is able to construct, send, and view messages as if the cybercriminal was the particular user. Having compromised the user account, the cybercriminal can send messages posing as the user. For example, the user may be an employee of a company and the cybercriminal may send emails to customers of the company requesting that the customers perform certain actions or provide certain sensitive information (e.g., a bank account number, a username, a password, an identification number, etc.).

In the example of FIG. 1A, the compromised account is used to send messages that include notifications to business partners of the company. The notifications can indicate that the business partners have a payment that is due to the company and that the payment should be transferred to a certain account, such as the cybercriminal's account. Accordingly, the customers receive the message, and, having no way to verify the individual that sent the message is a cybercriminal rather than the user associated with the compromised account, the business partners may transfer payments to the cybercriminal's account.

In the example of FIG. 1B, the compromised account is used to send messages requesting payment from a customer or another employee of the company. Again, having no way to verify that the individual that sent the message is a cybercriminal rather than the user associated with the compromised account, the customer or employee may transfer payments to the cybercriminal's account.

In the example of FIG. 1C, the compromised account corresponds to a certain individual within the company. For example, the certain individual may be an executive of the company (e.g., CEO, CFO, CTO), a manager of the company, or an attorney for the company. The cybercriminal poses as the individual within the company, and requests payment or information from someone within the contact list of the individual. In the example of FIG. 1C, the cybercriminal sends a message to the finance team at the company, requesting that the finance team send money to a certain account. In reality, the account corresponds to one controlled by the cybercriminal, who is able to fraudulently receive money from the finance team.

In each of the examples of FIGS. 1A-1C, a recipient of a message is unable to confirm that the sender of the message is not the individual associated with the account that sent the message. Instead, the recipient believes that the sender is who they say they are, enabling a malicious entity to commit a cybercrime. The present disclosure includes systems that can be used to prevent the types of cybercrimes described with respect to FIGS. 1A-1C, by allowing a user device of a person sending a message to send the message with a digital signature, which a recipient device can use to verify that the message was authorized by the person. An example of such a system is described with respect to FIG. 2.

Figure 2:
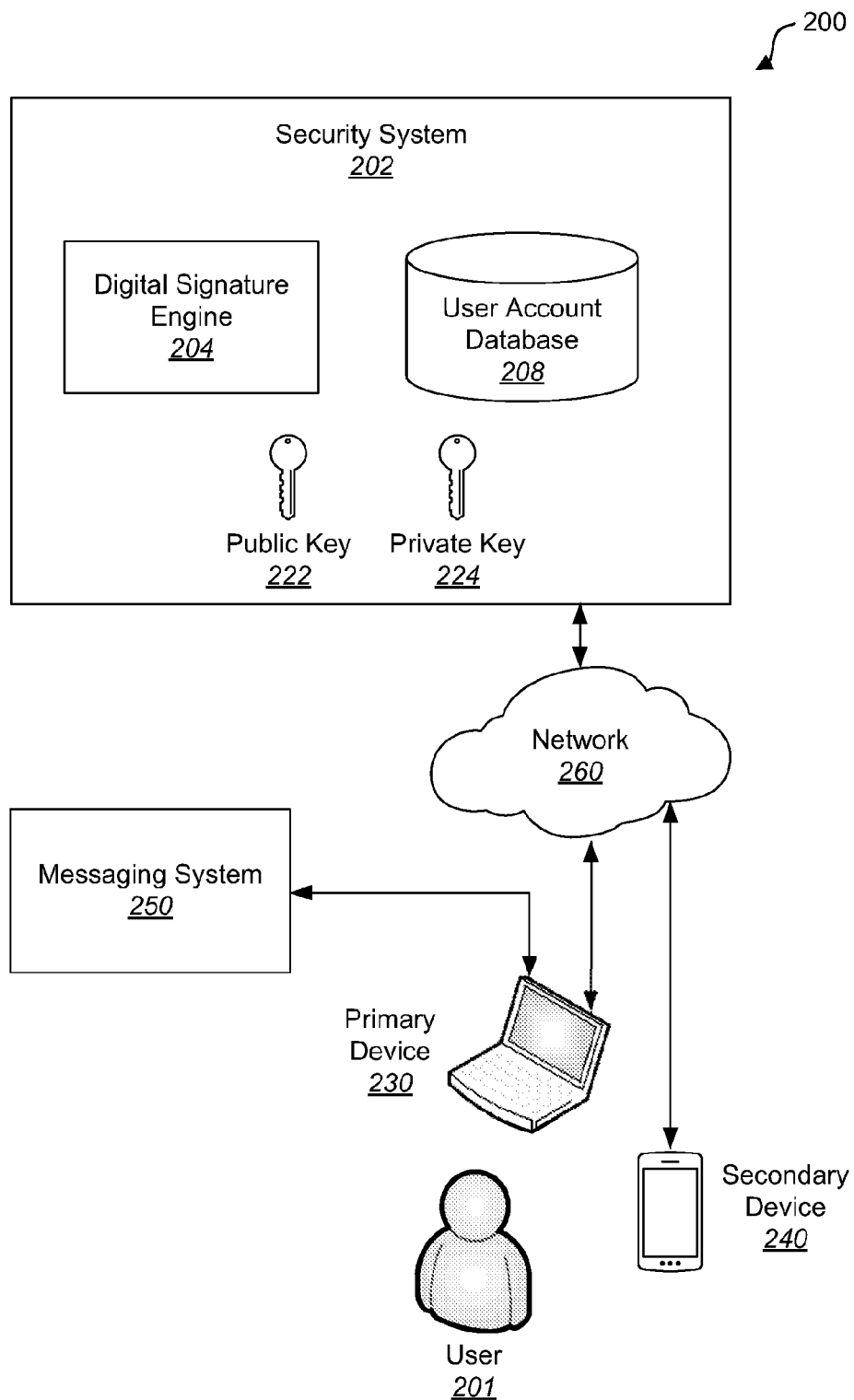
FIG. 2 is a block diagram illustrating an example of a security system for providing digital signature security for messages.

FIG. 2 is a block diagram illustrating an example of a message security system 200 for providing digital signature security for messages. The message security system 200 includes a security system 202, communicatively coupled to a primary device 230 and a secondary device 240 by a network 160. The security system 202 includes one or more security servers. The primary device 230 and the secondary device 240 can be any type of electronic device that is capable of sending and receiving messages through a network. In some examples, either one or both of the primary device 230 and secondary device 240 can be a mobile device, a desktop computer, a tablet computer, a wearable device (e.g., a smart watch or other wearable), a television (e.g., a network-connected television), a set-top box, and/or other device. In one illustrative example, the primary device 230 is a personal computer (e.g., a laptop or a desktop computer) and the secondary device 240 is a mobile device (e.g., a smartphone, a tablet computer, a wearable device, etc.). In one illustrative example, the primary device 230 can include a laptop computer and the second device 240 can include a mobile phone.

The network 260 can be any kind of network capable of enabling communication between the security system 202 and the one or more devices (e.g., the primary device 230 and the secondary device 240). For example, the network can be a WiFi network. The security system 202 can include one or more server computers that can process message data and/or other data and communicate to one or more devices communicatively coupled to the security system by a network 260.

In some cases, the security system 202 can include a cloud infrastructure system (also referred to as a cloud network) that provides cloud services to the one or more devices to which the security system 202 is connected (e.g., the primary device 230 and the secondary device 240). For example, an application (e.g., mobile application, a computer desktop application, or other suitable device application) and/or a website associated with a provider of the security system 202 can be installed and/or executed by the one or more devices communicatively coupled to the security system. In such an instance, the application and/or website can access (e.g., through a network) the cloud services provided by the security system 202. In another example, the cloud network of the security system 202 can host an application, and a user can use the application on demand through a communication network (e.g., the Internet, a WiFi network, a cellular network, and/or using another other suitable communication network). In some examples, the cloud services provided by the security system 202 can include a host of services that are made available to users of the cloud infrastructure system on demand. Services provided by the cloud infrastructure system can dynamically scale to meet the needs of its users. The cloud network of the security system 202 can comprise one or more computers, servers, and/or systems. In some cases, the computers, servers, and/or systems that make up the cloud network are different from on-premises computers, servers, and/or systems that may be located at a site (e.g., a site hosting an event).

One or more components of the message security system 200 can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

While the message security system 200 is shown to include certain components, one of ordinary skill will appreciate that the message security system 200 can include more or fewer components than those shown in FIG. 2. For example, the message security system 200 can also include, or can be part of a computing device that includes, an input device and an output device (not shown). In some implementations, the message security system 200 may also include, or can be part of a computing device that includes, one or more memory devices (e.g., one or more random access memory (RAM) components, read-only memory (ROM) components, cache memory components, buffer components, database components, and/or other memory devices), one or more processing devices (e.g., one or more CPUs, GPUs, and/or other processing devices) in communication with and/or electrically connected to the one or more memory devices, one or more wireless interfaces (e.g., including one or more transceivers and a baseband processor for each wireless interface) for performing wireless communications, one or more wired interfaces (e.g., a serial interface such as a universal serial bus (USB) input, a lightening connector, and/or other wired interface) for performing communications over one or more hardwired connections, and/or other components that are not shown in FIG. 2.

In some implementations, one or more components of the message security system 200 (e.g., the security system 202) can be implemented locally by and/or included in a computing device. For example, the computing device can include a mobile device, a personal computer, a tablet computer, a wearable device, a server (e.g., in a software as a service (SaaS) system or other server-based system), and/or any other computing device with the resource capabilities to perform the techniques described herein.

One or more components of the message security system 200 can be integrated with (e.g., integrated into the software, added as a plug-in, or otherwise integrated with) a software application, such as an email messaging application (e.g., Microsoft Outlook, Gmail, among others), a social network messaging application (e.g., Instagram™, Facebook™, Pinterest™, Snapchat™, among others), a text messaging application (e.g., one configured to send SMS, EMS, or MMS), an instant messaging (IM) application, or any other suitable application. The software application can be a mobile application installed on a mobile device (e.g., a mobile phone, such as a smartphone, a tablet computer, a wearable device, or other mobile device), a desktop application installed on a desktop computer, or other software application.

A user 201 can use the primary device 230 to connect to a messaging system 250 for viewing, sending, and/or receiving messages, and/or perform other messaging functions. The primary device 230 can display a user interface. The user 201 can interact with and provide input to the primary device 230 using the user interface, such as to view and send messages, and/or perform other messaging functions. The messaging system 250 can maintain user accounts, such as a user account associated with the user 201. The messaging system 250 is configured to send messages between devices associated with user accounts maintained by the server. In one illustrative example, the messaging system 250 can be an email messaging system configured to send emails between devices of users that own the email accounts.

In some examples, in addition to having a messaging account with the messaging system 250, the user 201 can set up an account with the security system 202. The security system 202 can maintain the account of the user 201, and can also maintain accounts of other users of the security system, in a user account database 208. The security system 202 is configured to use a digital signature engine 204 to generate a digital signature for a message to be sent by one of the devices communicatively coupled to the security system (e.g., a device associated with a user having a user account stored in the user account database 208). In some examples, the digital signature engine 204 can use a private key 222 and a hash of the message to be sent to generate the digital signature. The private key 222 can be an asymmetric private key having a corresponding public key 224.

Figure 3:
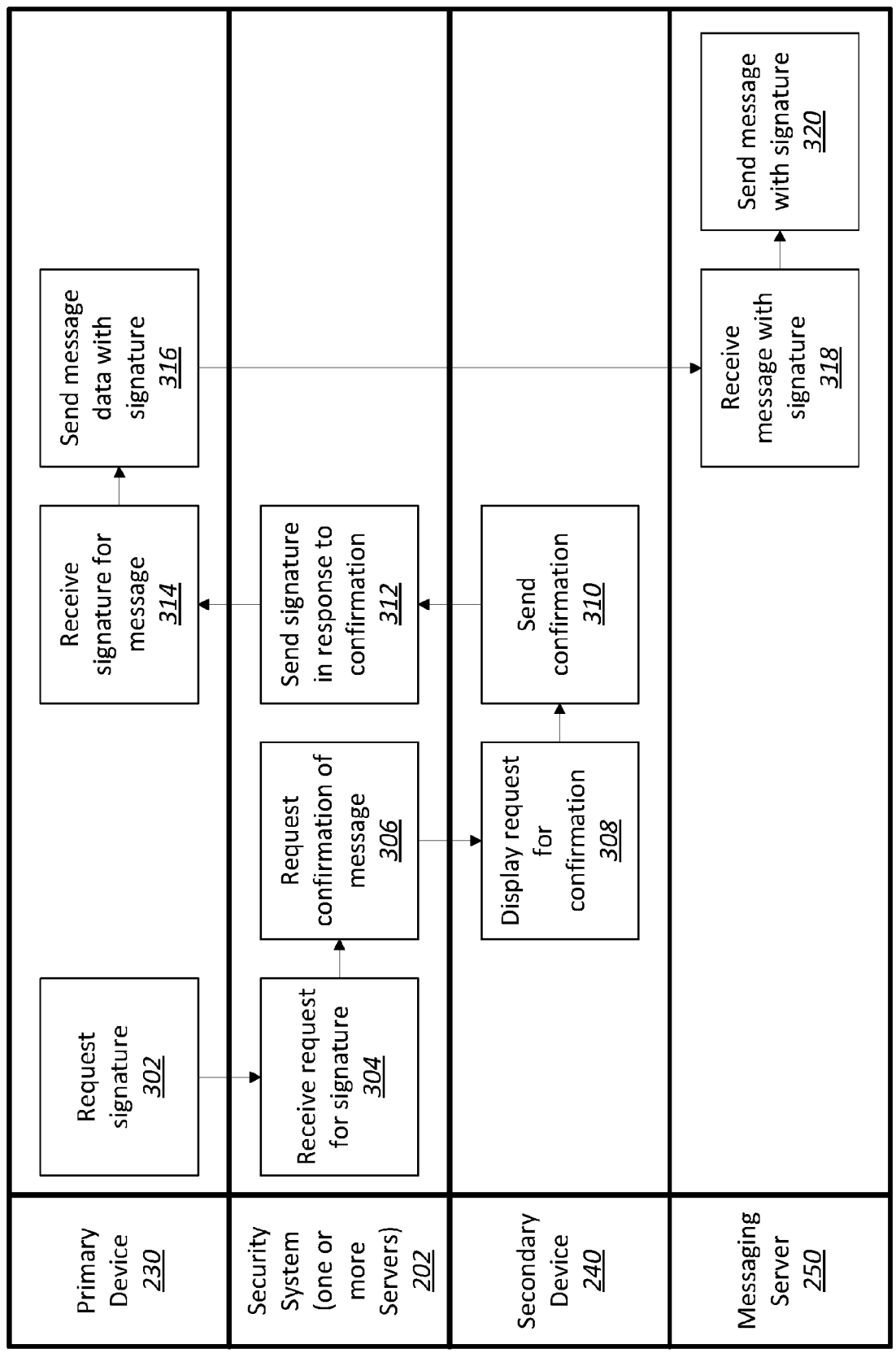
FIG. 3 is a swim lane diagram illustrating actions performed by the components of the system of FIG. 2.
Figure 4:
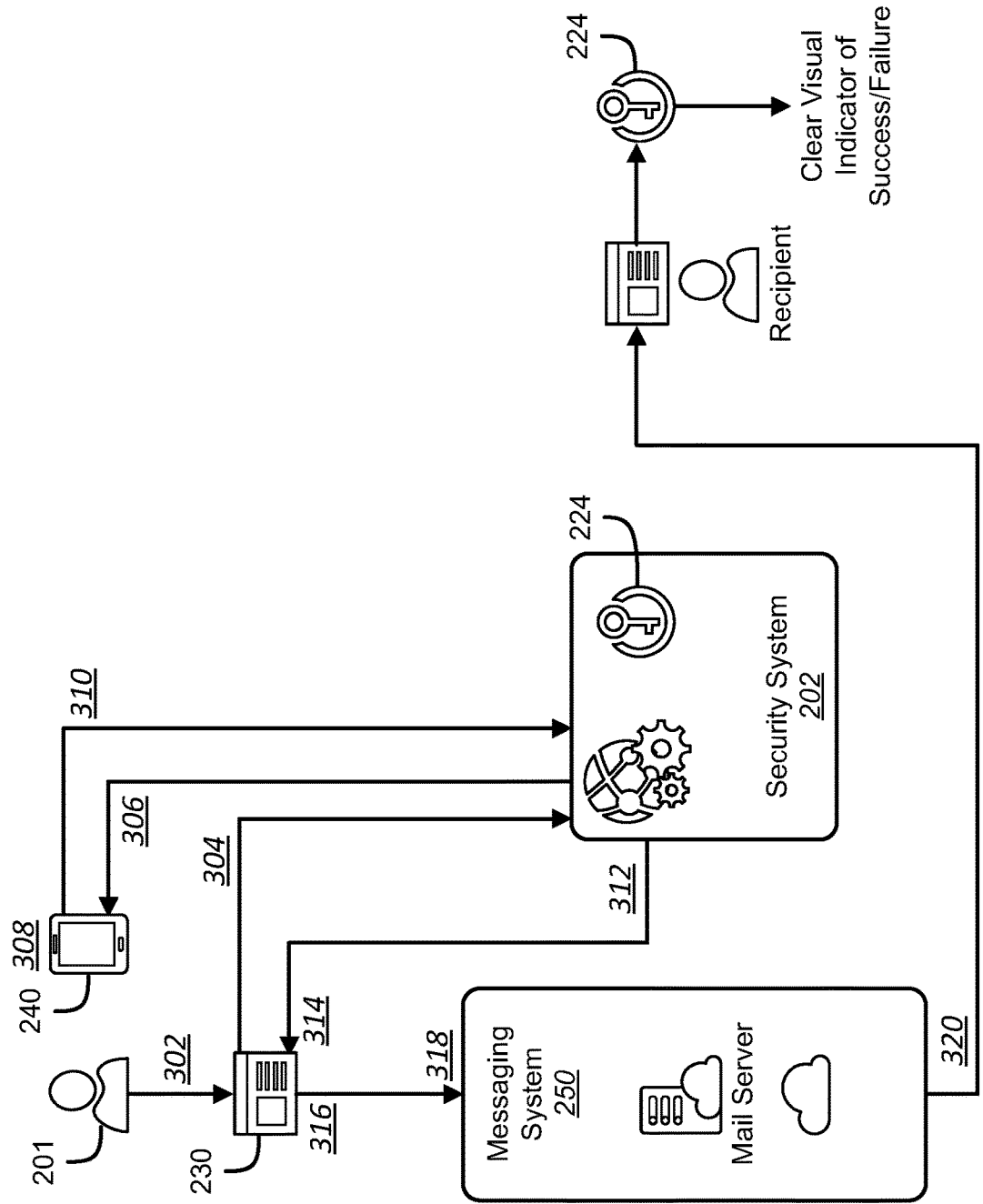
FIG. 4 is a diagram illustrating an example flow of data between components of the system of FIG. 2.

A user 201 can use the primary device 230 and the secondary device 240 to authenticate a message sent using the messaging system 250, as described in greater detail with respect to FIGS. 3-6. FIG. 3 is a swim lane diagram illustrating actions performed by the components of the message security system 200, while FIG. 4 is a diagram illustrating an example flow of data between components of the message security system 200.

Figure 5A:
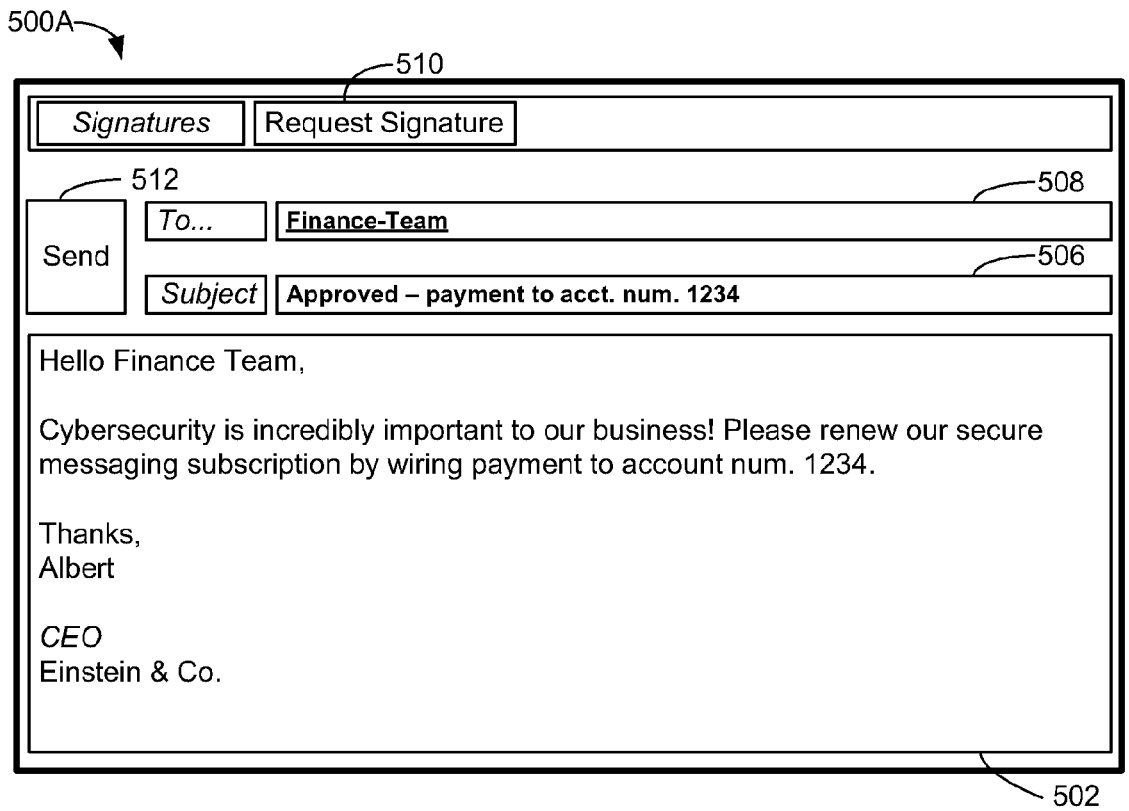
FIG. 5A is an example of a user interface for composing a message with a digital signature.

Referring to FIGS. 3 and 4, at stage 302, the user 201 provides user input using a user interface of the primary device 230. The user input causes a primary device 230 of the user to request a digital signature to be sent along with a message. FIG. 5A is an example of a user interface 500A for composing a message with a digital signature. For example, the user interface 500A can be displayed on the primary device 230.

In the example of FIG. 5A, the user 201 is a corporate executive. The user 201 composes a message 502 that includes the subject "Approved-payment to acct. num. 1234", which is visible in a "Subject" field 506. The user interface 500A further includes a "To" field 508. The "To" field 508 shows that the message 502 is addressed to "Finance-Team", which in the example of FIG. 5A is the finance team of the company at which the user 201 is an executive. In the message 502, the user 201 requests that the finance team send payment to a certain account.

The example of FIG. 5A is similar to the example of FIG. 1C, in which a company executive requests payment. If the primary device 230 sends the message without adding a digital signature, the recipient device and the recipient (e.g., a member of the finance team) would be unable to verify that the message 502 was sent by the company executive. To ensure that the finance team knows that the message 502 was authorized by the user 201, the user can select a "Request Signature" button 510 to request that a digital signature be sent along with the message. As described in more detail below with respect to FIG. 3, the security system 202 can generate a digital signature based on the user 201 selecting the "Request Signature" button 510. After requesting the digital signature, the user 201 can request the message be sent using the "Send" button 512, just as the user would send a conventional message (e.g., one without additional message security provided by the digital signature generated by a security system such as the security system 202).

Returning to FIGS. 3 and 4, at stage 304, the security system 202 receives, from the primary device 230, the request for the digital signature. At stage 306, the security system 202 requests confirmation that the user made the request for the digital signature by sending a request for confirmation to the secondary device 240. For example, the security system 202 can send the request for confirmation to the secondary device 240 through the network 260.

Figure 6:
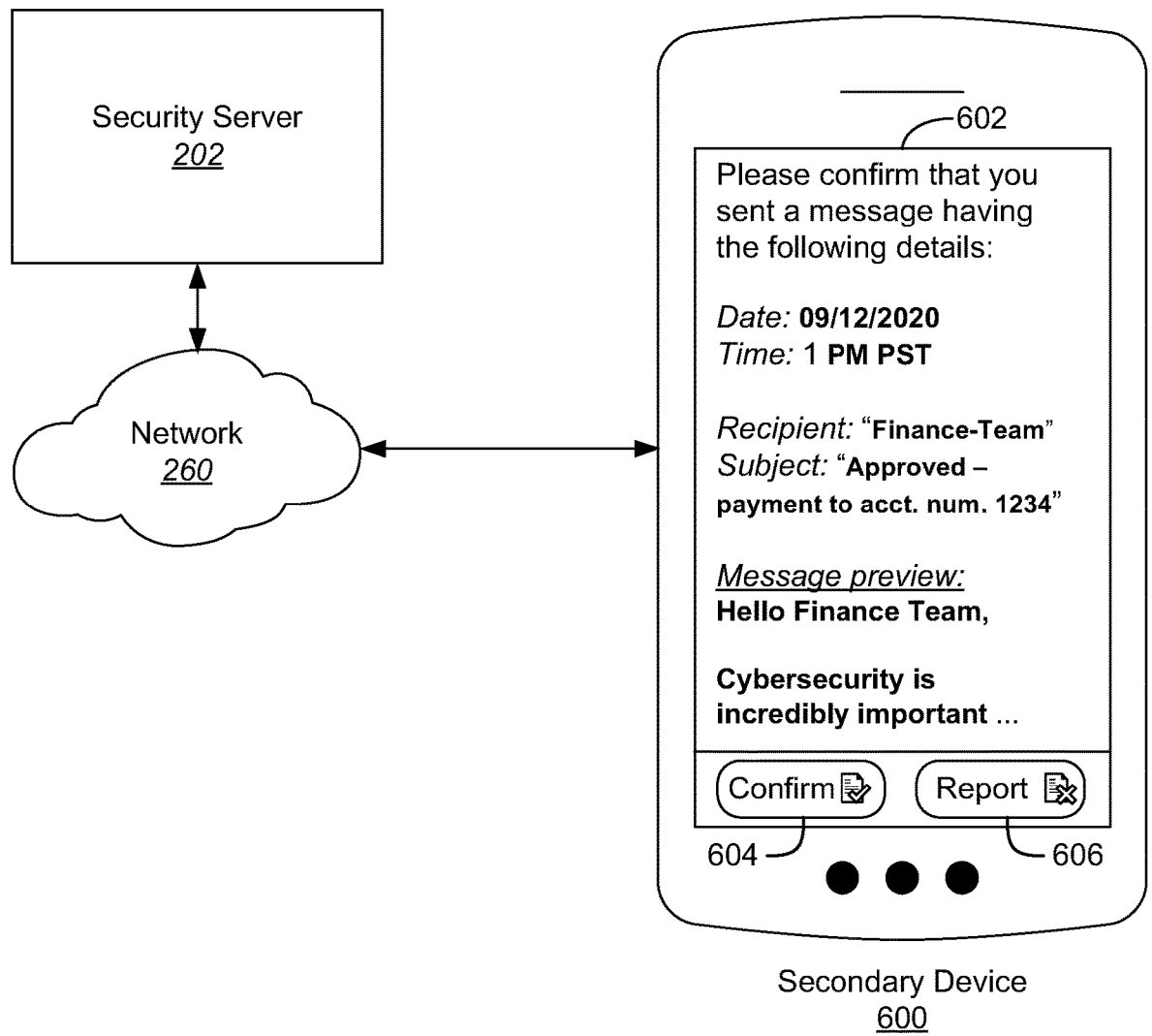
FIG. 6 is a diagram illustrating an example of a request for confirmation received by a secondary device of the security system of FIG. 2.

At stage 308, the secondary device 240 receives the request for confirmation. FIG. 6 is a diagram illustrating an example of a confirmation message 602 received by a secondary device of the security system 202. It should be understood that the secondary device 600 is just one example of the secondary device 240. As shown, the secondary device 600 receives a request for confirmation from the security system 202. The request for confirmation received by the secondary device can include one or more categories of details, such as a date, time, recipient, subject, and preview for the message 502. Upon receiving the request for confirmation, the secondary device 240 can generate the confirmation message 602 based on input from the user indicating the user has confirmed that they submitted the signature request. In some cases, the user can view details of the message 502 displayed by the secondary device 240. For example, the details of the message 502, which are displayed with respect to the confirmation message 602, can be sent by the primary device 230 and received by the secondary device 240. In some cases, the primary device 230 can send the details of the message 502 to the secondary device 240 through the network 260. The details can be displayed so that the user can confirm that the details for the message (e.g., a subject of the message, the body of the message, a recipient of the message, etc.) the user is authorizing is correct.

In some implementations, the secondary device 240 includes a notification application installed on the device. The notification application can be used to perform a one-time registration of the secondary device 240 to register the device as a valid device to be used to confirm that a signature was requested for a message. When a signature request is received, the security system 202 can send a notification to the registered secondary device 240. In some implementations, the security system 202 can send the secondary device 240 a hash of the message, or other information such as a portion of the message, which the user of the secondary device 240 can use to verify the message. The hash or other information can be received from the primary device 230 or the security system 202. One advantage of sending only a portion of the message is that the remaining portion of the message can be kept confidential from the secondary device 240 and the security system 202.

In the example of FIG. 6, the secondary device 600 is a device accessible to the user 201 and is a different device than the primary device 230. In one illustrative example, as noted above, the primary device 230 can include a laptop computer, and the secondary device 600 (as an example of the secondary device 240) can include a mobile device such as a phone. The secondary device 600 displays the confirmation message 602. As shown, the confirmation message 602 allows the user 201 to view information or details associated with the message 502. The confirmation message 602 also includes a prompt for the user 201 to confirm whether the user 201 requested a signature for the message 502 that has the displayed details associated with the message 502. For example, the confirmation message 602 includes text that reads "Please confirm that you sent a message having the following details:", followed by details associated with the message 502. As shown, the confirmation message 602 includes a date and time that the message 502 was sent by the user 201 (e.g., the date and time that the user selected the Send button 512, or the date and time that the security system 202 received the request for the digital signature).

The confirmation message 602 also includes a recipient and a subject, corresponding to the entity that the user 201 intends the message 502 to be received by and the subject of the message, respectively. For example, the confirmation message 602 displays "Finance-Team" as the recipient of the message 502, corresponding to the recipient specified in the To field 508 of the message 502 (from FIG. 5). With regard to the subject of the message 502, the confirmation message 602 displays the text "Approved—payment to acct. num. 1234", which corresponds to the text of the Subject field 506 from FIG. 5. The confirmation message 602 further includes a message preview, which reads "Finance Team, Cybersecurity is incredibly important . . . ", which corresponds to a portion of the message 502.

The user 201 can either confirm that they requested a digital signature for the message 502 using the "Confirm" button 604, or report that they did not request the digital signature using the "Report" button 606. Reporting the message can send an alert to the security system 202, which can take one or more remedial actions. In one example, the security system 202 can send an alert or other notification to the primary device 230 or secondary device 240 of the user 201, indicating a possible breach of their account. For instance, in response to the user 201 selecting the Report button 606, the security system 202 can send a message (e.g., an email sent to a backup email address of the user or a text message sent to a mobile device of the user) alerting the user that an unauthorized entity may have attempted to send a message having the details displayed with respect to the confirmation message 602. In another example, the security system 202 can send an alert or other notification (that indicating a possible breach of the user's account) to an account (e.g., an email account) and/or device of an administrator of a company for which the user 201 is employed.

If, after reviewing the confirmation message 602, the user 201 selects the Confirm button 604, at stage 310, the secondary device 240 can send a confirmation to the security system 202. In response to receiving the confirmation, at stage 312, the security system 202 can send a digital signature to the primary device 230.

The security system 202 generates the digital signature for the message 502 prior to sending the signature to the primary device 230. For example the security system 202 can use the digital signature engine 204 to generate the digital signature for the message using the message data and the private key 224. In some implementations, the private key 224 can be an asymmetric private key that is maintained confidentially by the security system 202, such that the private key is not shared with other servers or electronic devices. In accordance with asymmetric cryptography, the security system 202 maintains the public key 222, which is shared with other entities, such as a user interface for the security system 202, (e.g., user interface 500A or user interface 500B, which is described below with respect to FIG. 5B). In some implementations, the digital signature engine 204 can use a Rivest-Shamir-Adleman (RSA) algorithm to generate the digital signature.

In some implementations, instead of or in addition to sending the digital signature to the primary device 230 at stage 312, the security system 202 signs the message 502 using the digital signature engine 204 (e.g., using the private key 224) and sends the signed message to the primary device 230. If the security system 202 signs the message 502, then prior to signing the message, the security system receives, from the primary device 230, the message 502 or a hash of the message (e.g., to preserve the privacy of the message).

In some implementations, instead of or in addition to sending the digital signature to the primary device 230 at stage 312, the security system 202 signs a hash of the message using the digital signature engine 204 (e.g., using the private key 224) and sends the signed hash to the primary device 230. In some implementations, when the secondary device 240 receives a portion of the message to be displayed during verification of the message, the security system 202 can receive both the hash of the message plus the portion of the message from the primary device 230. In this example, the security system 202 uses the hash of the message to generate the digital signature.

At stage 314, the primary device 230 receives the digital signature from the security system 202. In implementations in which the security system 202 signs the message 502 or the hash of the message 502, at stage 314, the primary device 230 receives, from the security system 202, the signed message or the signed hash, respectively. For example, the security system 202 can sign the message 502 or the hash of the message 502 using the private key 224.

At stage 316, the primary device 230 sends the digital signature and data associated with the message 502 to the messaging system 250. For example, the data associated with the message 502 can include information that the messaging system 250 uses to deliver the message, such as account information of the recipient (e.g., the email address of the recipient), the body and subject of the message, and metadata of the message, such as a date and time that the message was sent. In some implementations, the primary device 230 sends the digital signature and the data associated with the message 502 to the messaging system 250 as a single set of data (e.g., as a single communication that includes both the signature appended to the data associated with the message). As another example, the primary device 230 can attach the digital signature to a header of the message (e.g., the primary device can append the digital signature to a header of an email message) as discussed in more detail below with respect to operation 806. In other implementations, the primary device can send the digital signature and the data associated with the message 502 as separate sets of data (e.g., as separate communications).

At stage 318, the messaging system 250 receives the digital signature and the data associated with the message 502. For example, the messaging system 250 can receive the digital signature and the data associated with the message 502 as a single set of data, in which case the messaging system 250 can identify the digital signature and the data associated with the message 502 from the single set of data. In other implementations, the messaging system 250 can receive the digital signature and the data associated with the message 502 as separate sets of data.

At stage 320, the messaging system 250 sends the message 502 and the digital signature for the message to a device of the recipient. The messaging system 250 addresses the message 502 and the digital signature for the message to the recipient, although in some implementations, the messaging system 250 does not send the message and digital signature directly to the recipient device. For example, in some implementations, the messaging system 250 sends the message 502 and the digital signature to an email server that may send the message and signature to the recipient or may send the message and signature to another email server. A chain of one or more email servers may receive the message 502 and the signature for the message before the message is received by the recipient device.

Figure 5B:
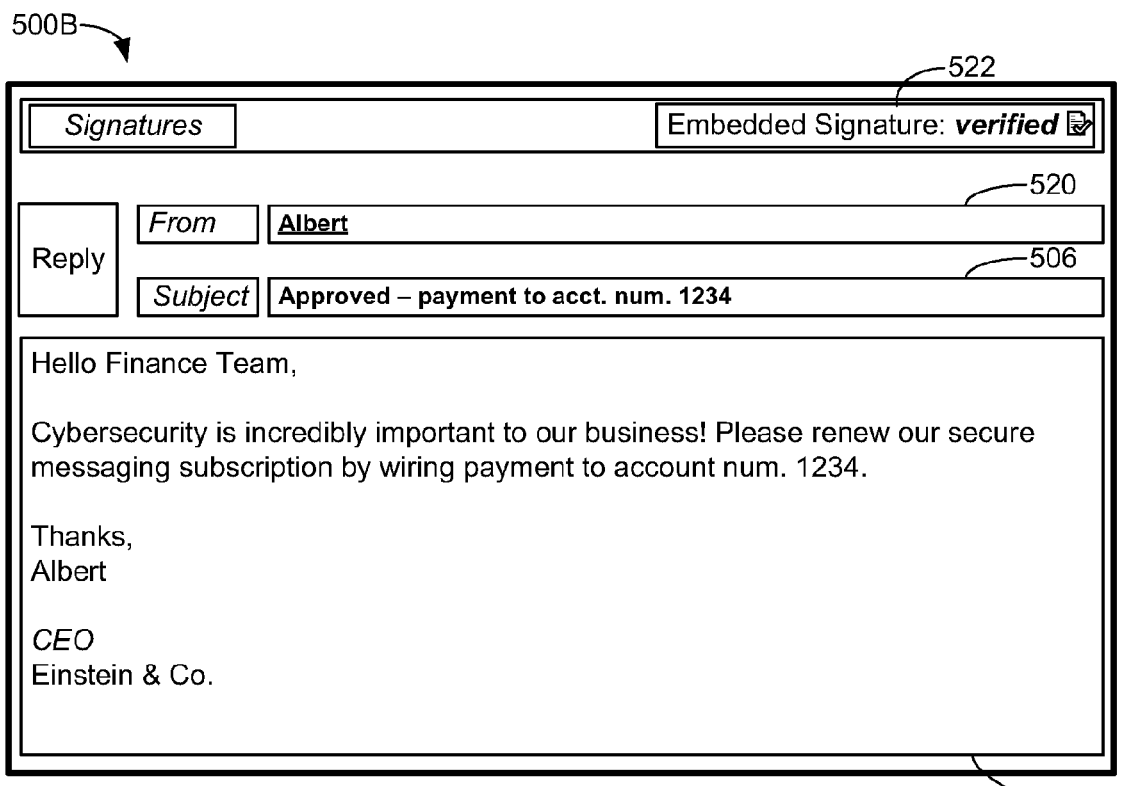
FIG. 5B is an example of a user interface for viewing a message with a verification of a received digital signature.

When a recipient device receives and displays the message 502, the recipient can view the message on their device using a user interface. FIG. 5B is an example of a user interface 500B for viewing a message with a verification of a received digital signature. The user interface 500B includes a "From" field 520, which shows that the message 502 is from "Albert". Like the user interface 500A, the user interface 500B includes the Subject field 506 and the message 502, which was composed by the user 201. The recipient of the message 502, an individual with access to the "Finance-Team" email account, can view the message 502. The user interface 500B further includes a visual indication that the message 502 was authorized to be sent with a digital signature. For example, as shown, the user interface 500B displays an "Embedded Signature" field 522 displaying the word "verified" and a graphical icon indicating a successful verification of the digital signature. The user interface 500B displays the Embedded Signature field 522 to confirm to the recipient that the message was sent with a digital signature. Accordingly, the recipient, a member of the Finance Team, can confirm that the sender, Albert, requested the digital signature for the message and that the instructions to transfer money to a certain account can be trusted.

In some examples, in addition to or as an alternative to the visual indication that an embedded digital signature for a message is a verified signature, coded information (e.g., a barcode, such as a quick response (QR) code) can be embedded or otherwise included with a message. Before the recipient device will display the content of the email for viewing by the recipient, the recipient may be required to use an application of the recipient device or a mobile device to scan the embedded coded information. Upon scanning the coded information (e.g., a QR code), a request can be sent to the security system 202 (e.g., a security server of the security system 202) to verify that the message is secure. Once the security system 202 verifies the message is secure, the recipient device can display the content of the email and the recipient is thus granted access to the email.

As described above with respect to FIGS. 5A and 5B, the user interfaces 500A and 500B include features that enable a digital signature to be requested and features that enable a visual indication that an embedded digital signature for a message is a verified signature. The user interfaces 500A and 500B can be user interfaces provided by the messaging system 250, which can be altered using software provided by the security system 202. The alteration can add the Request Signature button 510 and the Embedded Signature field 522, allowing the user interfaces to receive requests for digital signatures (e.g., for user interfaces that send messages) and display visual indications of verified signatures (e.g., for user interfaces that receive messages).

In some cases, a public key associated with the security system 202 (e.g., by communicating with one or more security servers of the security system 202) can be used by multiple user devices to authenticate messages. For instance, the confirmation sent at stage 310 of FIG. 3 from the secondary device 240 to the security system 202 can be signed by the secondary device 240 using a private key. When the confirmation (sent at stage 310) with a signature (e.g., signed using the private key) is received by the security system 202 from the secondary device 240, the security system 202 can verify that the confirmation (sent at stage 310) was signed by the secondary device 240 of the user 201 as opposed to another (non-authorized) device. Once the security system 202 verifies that the signature of the confirmation (sent at stage 310) is valid, the security system 202 can then re-sign the confirmation and send the signature at stage 312. The primary device 230 can use the public key associated with the security system 202 to decrypt the confirmation message. In such cases, there is one public key for the whole security system 202, as opposed to individual public keys for each user device.

In some examples, a user registration flow is provided to allow the user 201 to use the primary device 230 or secondary device 240 to register their public key with the security system 202. For instance, the registration is initiated by the primary device 230 or the secondary device 240 of the user 201 sending a request (e.g., a Representational State Transfer (REST) call) to a security server (e.g., a signing server) of the security system 202. The security server can create or generate a dynamic password (e.g., a temporary one-time passcode (TOTP)) that can change at a given interval (e.g., the password can change every 30 seconds, 60 seconds, or other interval). For instance, the server can generate the dynamic password based in part on the email address of the sender. The server can also generate an authentication code (e.g., a hash-based message authentication code (HMAC)). The authentication code is a unique set of information that can be signed (e.g., by a mobile device of the sender) to provide proof of possession of a private key (of a public-private key-pair discussed below). The authentication code provides verification that the information it is used to sign (e.g., the private key) has not been modified or tampered with.

The security server of the security system 202 can format the dynamic password into coded information (e.g., a QR code or other coded information) and can email the coded information and the authentication code (e.g., the HMAC) to the secondary device 240 of the user 201. The user 201 can then use the secondary device 240 to scan the coded information (e.g., the QR code), such as using a camera application of the secondary device 240. Upon scanning the coded information (e.g., the QR code), the secondary device 240 can launch an email application. Based on the coded information, the email application of the secondary device 240 can detect a registration request and can trigger secure hardware of the secondary device 240 to create a public-private key-pair (e.g., an Elliptic Curve 256-bit key-pair). In some cases, the secondary device 240 can store the private key in secure hardware (e.g., Android StrongBox™ or iOS Secure Enclave™) with flags set to require user authentication upon use (Android Protected Confirmation™ or iOS™ keychain access control flags). The secondary device 240 (using the email application) can then sign the authentication code (e.g., the HMAC) and return the signature, the authentication code, and the public key (and in some cases other data, such as the device- and application-specific FCM token) to the security server as proof-of-possession of the private key.

Upon receiving the signature, the authentication code, and the public key, the security server can check for a valid authentication code (e.g., HMAC), a valid dynamic password (e.g., TOTP) token, and a valid signature. The security server can thus tie the secondary device 240 of the sender to an email address of the sender by sending the secondary device 240 the authentication code (e.g., the HMAC) that is based on the email address and the dynamic password (e.g., the TOTP) and then receiving a signature that can be validated by the security server. While an email address is used for illustrative purposes, the authentication code (e.g., the HMAC) may be based off of other information associated with the sender, such as a physical address, a phone number, a serial number of the user's mobile device, and/or other information. In some examples, an operating system of the secondary device 240 can additionally provide attestation information that can prove to the server that the private key is stored in secure hardware of the secondary device 240.

After verification, the security server of the security system 202 can generate a password (e.g., an application programming interface (API) key) and can send (e.g., via email) the password (e.g., the API key) to the user's computing device. The password allows the primary device 230 of the user 201 to send a push notification to the secondary device 240 in order to request authentication of a digital signature (e.g., at stage 306 of FIG. 3 where the security system 202 requests confirmation that the user made the request for the digital signature). In some cases, the security server can also store the password (e.g., the API key), the public key, and the FCM token alongside the email address for later use.

Such a registration flow can enable a secure registration for uses. For example, the registration flow allows the security server to store no state for each registration. The registration flow can also introduce a time-bound for a registration request (e.g., prior to expiration of the TOTP). The registration flow can also make it difficult for an attacker to perform a denial-of-service (DoS) attack based on the security server verifying multiple asymmetric operations (e.g., the security server checks for a valid authentication code such as an HMAC, a valid dynamic password (e.g., TOTP) token, and a valid signature). The registration flow may also require proof-of-possession of a private key.

Figure 7:
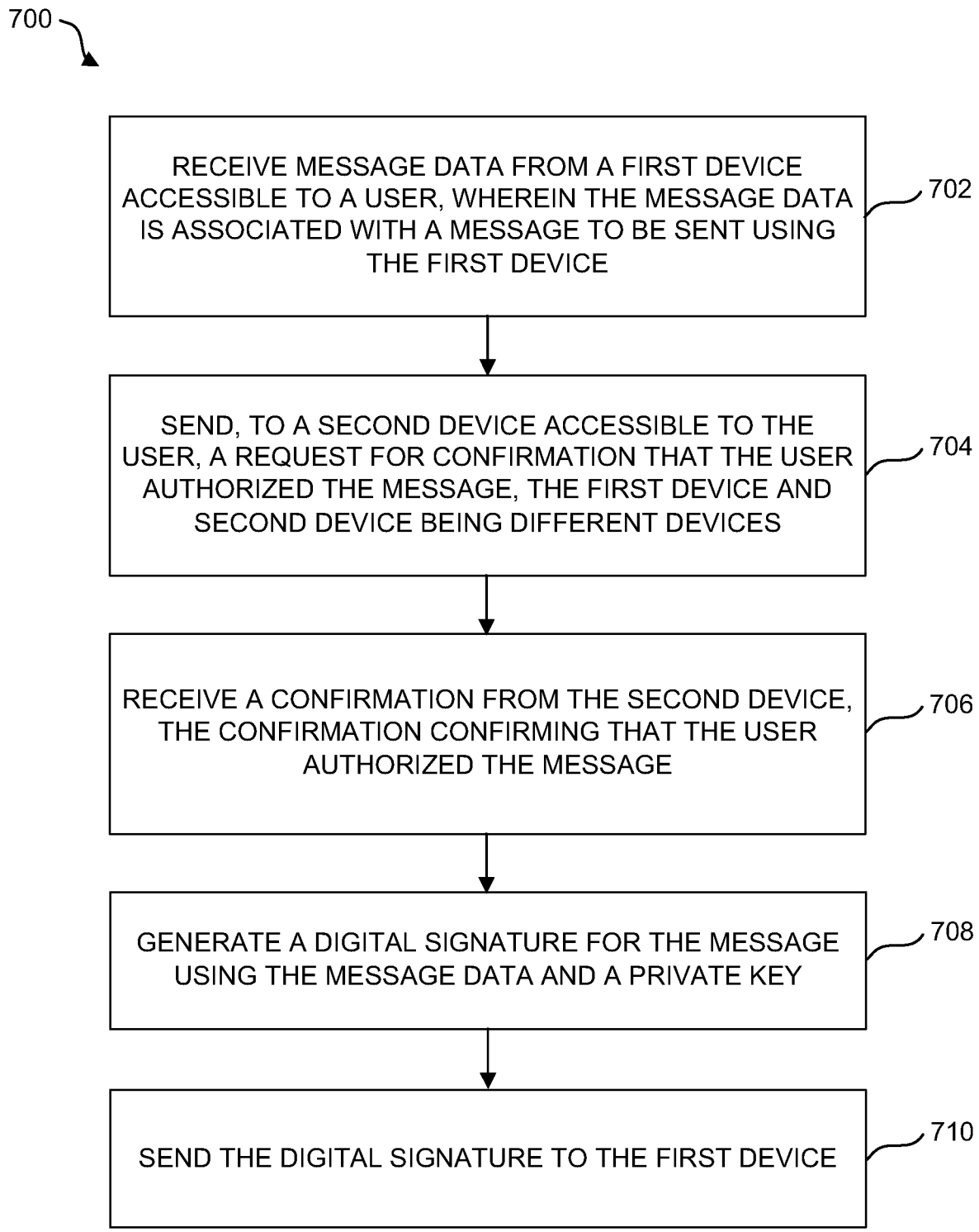
FIG. 7 is flow diagram illustrating an example of a message validation process.

FIG. 7 is a flow diagram illustrating an example of a message validation process 700. The message validation process 700 is described as being performed by a security system. For example, the security system 202, one or more network servers of a cloud service, or some combination thereof, can perform the message validation process 700.

At operation 702, the security system receives message data from a first device accessible to a user, wherein the message data is associated with a message to be sent using the first device. In one illustrative example, the first device can include the primary device 230. For example, the security system 202 can receive message data from the primary device 230, which is accessible to the user 201.

In some implementations, the message data can include a hash of the message to be sent. For example, the user 201 can interact with a user interface (e.g., the user interface 500A displayed on the primary device 230) to compose a message. The primary device 230 can include a hashing engine that is configured to receive data and generate a hash. In some implementations, the hashing engine is included in a user interface of the primary device. The message data used to generate the hash of the message can include the body of the message. In some implementations, in addition to the body of the message, a hashing engine can use a username (e.g., email address) associated with the sender and/or recipient of the message, a date and/or time that the message was sent, data associated with one or more recipients (e.g., email addresses specified in the "to", "cc", and/or "bcc" fields of an email message), data associated with a portion of the text (e.g., the subject of an email message), or a combination thereof to generate the hash of the message.

The primary device 230 can send the security system 202 the hash as message data. A benefit of sending the security system 202 the hash of the message (e.g., as opposed to the message itself) is that sending a hash can provide data compression and security for the message. For example, sending a hash can allow the primary device 230 to send less data as compared to sending the full message. As another example, because a hashing engine can be used to convert human-readable text to a non-human readable hash, sending the hash prevents the primary device 230 from sending the message, which may contain sensitive or confidential information, in a format that allows entities other than the user to read the message. For example, the security system 202 may receive only the hash of the message rather than the contents of the message, to preserve the privacy of the message. While the hash function is a one-way function, meaning it is difficult or impossible to determine the contents of the message using only the hash of the message, it is possible for the security system 202 to verify that the hash corresponds to the message when the message is known to the security server.

At operation 704, the security system sends, to a second device accessible to the user, a request for confirmation that the user requested the digital signature for the message. In one illustrative example, the second device can include the secondary device 240. The first device and second device are different devices. For example, while the first device may be a desktop computer or mobile device, the second device is a different device than the first device. The security system 202 can send a request for confirmation to a secondary device 240 (e.g., a mobile device) requesting that the user confirm that the user requested the digital signature for the message.

Ensuring that the first device and second device are different devices provides a security benefit to the user. For example, a cybercriminal may be able to compromise the messaging account of the user, and use the primary device to attempt to send a message posing as the user. However, because the security system sends the request for confirmation to the second device, a cybercriminal would need to have access to the second device (e.g., have the second device in their possession) in order to respond to the request for confirmation. Furthermore, if using the second device requires a password to unlock the device, the cybercriminal would need the password in order to respond to the request for confirmation. It is unlikely that a cybercriminal would be able to compromise both the messaging account of the user and the security provided by the second device. Therefore, sending a request for confirmation to the second device provides additional security.

At operation 706, the server receives a confirmation from the second device, the confirmation confirming that the user requested a digital signature for the message. For example, using the secondary device 240, the user 201 can confirm that they requested a digital signature for the message. The secondary device 240 can then send the confirmation to the security system 202.

At operation 708, the server generates a digital signature for the message using the message data and a private key. For example the security system 202 can use the digital signature engine 204 to generate the digital signature for the message using the message data and the private key 224, as described in greater detail above, with respect to FIG. 3.

At operation 710, the server sends the digital signature to the first device. For example, the primary device 230 can receive the digital signature and use the digital signature as a verification that the user requested a digital signature for the message, as described in greater detail with respect to FIG. 8. In some examples, the server can sign the message data using the private key. In some cases, the server can send the signed message data to the first device. In some examples, the signed message includes coded information for authenticating the signed message. For instance, the coded information can include a quick response (QR) code. The first device can then send the message and the coded information to a recipient device, which can scan the coded information to request verification from the server that the message was authorized to be sent with the digital signature by the particular individual associated with the first device.

Figure 8:
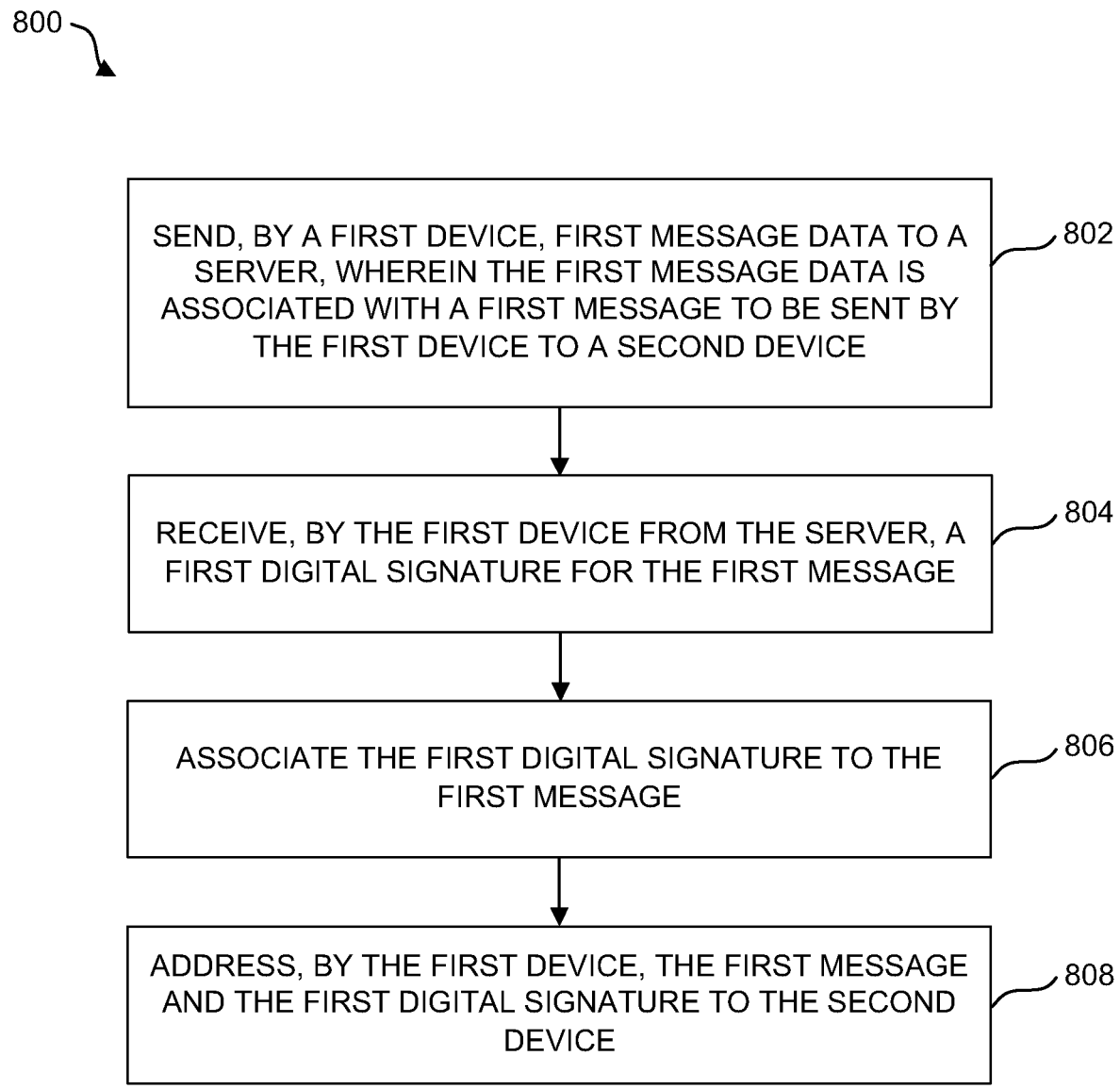
FIG. 8 is flow diagram illustrating another example of a message validation process.

FIG. 8 is a flow diagram illustrating an example of another message validation process 800. The message validation process 800 is described as being performed by an electronic device referred to as the first or primary device. For example, the primary device 230 can perform the message validation process 800.

At operation 802, the first device sends first message data to a server (e.g., a security server of a security system, such as the security system 202). The first message data is associated with a first message (e.g., an email) to be sent by the first device to a recipient device. For example, the primary device 230 can send the first message data to the security system 202. The first message data can include a hash of the first message generated using a hashing engine, as described above with respect to FIG. 7.

The sender of the first message can be a user, such as the user 201, who intends for the first message to be received by a recipient using the recipient device. The first message can include sensitive or confidential information, or a request for sensitive or confidential information. For example, the user 201 may request that the recipient transfer money or bank account information to the user. Knowing that the first message contains such a request, the user 201 can use a user interface to request that the first message be sent with a digital signature, as described above with respect to stage 302.

At operation 804, the first device receives from the security system a first digital signature for the first message. For example, the security system 202 can generate the digital signature and send it to the primary device 230 in response to the request that the first message be sent with a digital signature.

At operation 806, the first device associates the first digital signature with the first message. For example, the first device can embed the first digital signature into the first message. Embedding a digital signature into a message can include appending the signature to the contents of the email or adding a header to the message and appending the signature to the header.

At operation 808, the first device addresses the first message and the first digital signature to the recipient device. The first device addresses the first message and the first digital signature to the recipient device so that they can be sent to the recipient device. After addressing the first message and the first digital signature to the recipient device, the first device can send the first message and the first digital signature to a messaging system, such as the messaging system 250, which is configured to send messages and data related to messages. The messaging system 250 can then send the first message and the first digital signature to the recipient device. In some examples, the first message includes coded information for authenticating the signed message. For instance, the coded information can include a quick response (QR) code. As described above, the user of the recipient device can scan the coded information using the recipient device or another device (e.g., a mobile device). Upon scanning the coded information, the recipient device or other device can send a request for verification from the server (e.g., a security server of the security system 202) that the message was authorized to be sent with the digital signature by the particular individual associated with the first device.

As described above with respect to FIG. 7, a digital signature (e.g., the first digital signature) can be generated using message data (e.g., the first message data) and a private key for the security system. When the recipient device receives the first message, the recipient device verifies the digital signature using a public key corresponding to the private key. For example, while the security system 202 can use the private key 224 to generate the first digital signature, the recipient device can use the public key 222 to verify the digital signature. The public key 222 can be stored locally on the recipient device (e.g., in memory) or the public key 222 can be received over a network (e.g., prior to when the user interface uses the public key to verify a message).

In some implementations, the first device receives, from a sender device, a second message that includes a second digital signature. The second message is associated with second message data, such as a hash of the second message. The first device can then determine whether the second digital signature is valid using a public key for the security system.

The first device can determine that the second digital signature is valid using the public key. For example, the primary device 230 can use the public key 222 to verify the second digital signature. If the second digital signature can be verified using the public key 222, this confirms that the corresponding private key, the private key 224, was used to generate the second digital signature, indicating that the second digital signature is valid. For example, the second digital signature being valid indicates that the security system 202 generated the second digital signature using the private key 224 and the second message data. In response to determining that the second digital signature is valid, the first device can generate an indication that the second digital signature is valid and output (e.g., display) the indication using the user interface of the first device. For example, the user interface 500B displays the Embedded Signature field 522, which includes the text "verified", to indicate a valid digital signature.

If the second digital signature cannot be verified using the public key 222, this confirms that the private key 224 was not used to generate the second digital signature. For example, a private key other than the private key 224 may have been used to generate the second digital signature, if the public key 222 cannot be used to verify the second digital signature. Therefore, determining that the second digital signature cannot be verified using the public key 222 indicates that the second digital signature is not valid. In response to determining that the second digital signature is not valid, the first device can generate an indication that the second digital signature is not valid and output (e.g., display) the indication using the user interface of the first device. For example, instead of the Embedded Signature field 522 displaying the text "verified" the user interface 500B can display the text "not verified", or other text indicating that the second digital signature is not a valid digital signature.

In some cases, at least a subset of the message validation processes 700 and 800 illustrated by the flow diagrams of FIGS. 7-8 may be performed remotely by one or more network servers (e.g., of a cloud service). In some examples, the processes described herein (e.g., the message validation processes 700 and 800 and/or other processes described herein) may be performed by a computing device or apparatus. The message validation processes 700 and 800 can be performed by one or more of the primary device 230, the secondary device 240, and the secondary device 600, of FIGS. 2, 3, 4, and 6.

Figure 9:
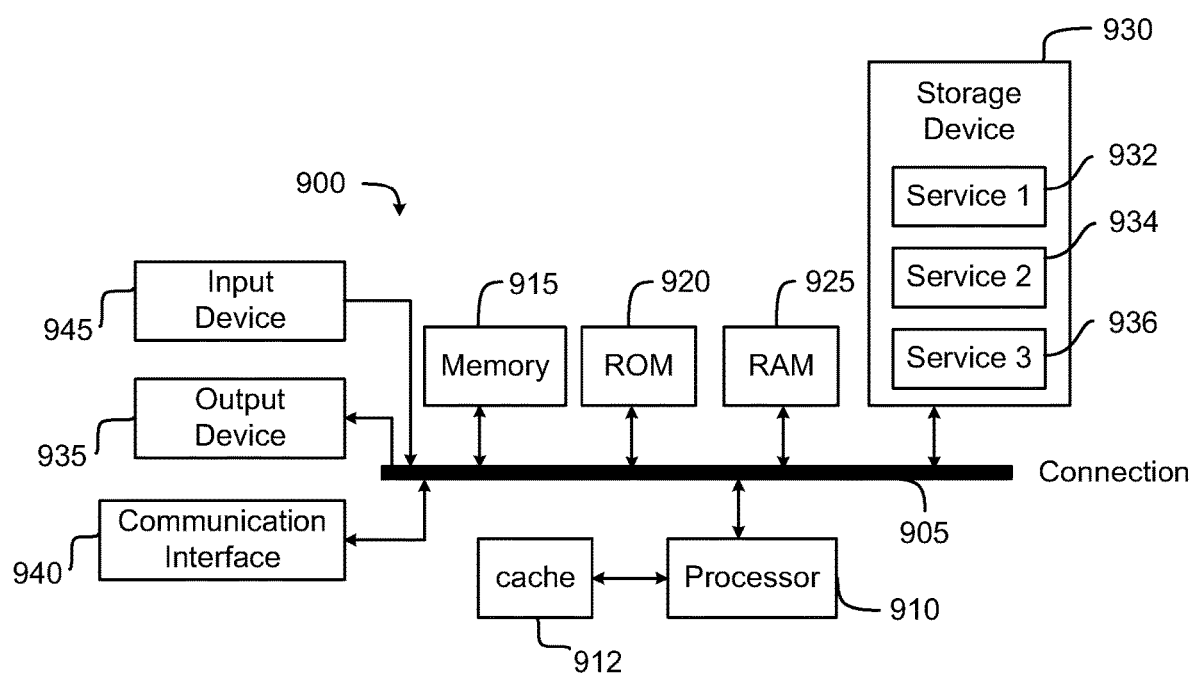
FIG. 9 is a diagram illustrating an example of a system for implementing certain aspects of the present technology.

The message validation processes 700 and 800 can be performed by a computing device with the architecture of the computing system 900 shown in FIG. 9. The computing device can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a television, and/or any other computing device with the resource capabilities to perform the processes described herein, including the message validation processes 700 and 800.

In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The processes illustrated by conceptual diagrams and flow diagrams of FIGS. 7-8 are organized as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes illustrated by conceptual diagrams and flow diagrams of FIGS. 7-8 and/or other processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

While FIGS. 2, 3, 4, and 6 illustrate or reference at least one of primary device 230, the secondary device 240, and the secondary device 600, it should be understood that the devices 230, 240, and 600 are just examples of devices that include the technologies discussed herein and/or perform the techniques discussed herein. The technologies and techniques discussed herein, including the message validation processes 700 and 800, can be performed by the devices 230, 240, and 600, a desktop computer, a mobile device, such as a smartphone, tablet, or laptop computer, or some combination thereof.

FIG. 9 is a diagram illustrating an example of a system for implementing certain aspects of the present technology. In particular, FIG. 9 illustrates an example of computing system 900, which can be for example any computing device making up internal computing system, a remote computing system, a camera, or any component thereof in which the components of the system are in communication with each other using connection 905. Connection 905 can be a physical connection using a bus, or a direct connection into processor 910, such as in a chipset architecture. Connection 905 can also be a virtual connection, networked connection, or logical connection.

In some embodiments, computing system 900 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 900 includes at least one processing unit (CPU or processor) 910 and connection 905 that couples various system components including system memory 915, such as read-only memory (ROM) 920 and random access memory (RAM) 925 to processor 910. Computing system 900 can include a cache 912 of high-speed memory connected directly with, in close proximity to, or integrated as part of processor 910.

Processor 910 can include any general purpose processor and a hardware service or software service, such as services 932, 934, and 936 stored in storage device 930, configured to control processor 910 as well as a special-purpose processor where software instructions are incorporated into the actual processor design. Processor 910 may essentially be a completely self-contained computing system, containing multiple cores or processors, a bus, memory controller, cache, etc. A multi-core processor may be symmetric or asymmetric.

To enable user interaction, computing system 900 includes an input device 945, which can represent any number of input mechanisms, such as a microphone for speech, a touch-sensitive screen for gesture or graphical input, keyboard, mouse, motion input, speech, etc. Computing system 900 can also include output device 935, which can be one or more of a number of output mechanisms. In some instances, multimodal systems can enable a user to provide multiple types of input/output to communicate with computing system 900.

Computing system 900 can include communications interface 940, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

The communications interface 940 may also include one or more Global Navigation Satellite System (GNSS) receivers or transceivers that are used to determine a location of the computing system 900 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 930 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a Blu-ray Disc™ (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L#), resistive random-access memory (RRAM/ReRAM), phase change memory (PCM), spin transfer torque RAM (STT-RAM), another memory chip or cartridge, and/or a combination thereof.

The storage device 930 can include software services, servers, services, etc., that when the code that defines such software is executed by the processor 910, it causes the system to perform a function. In some embodiments, a hardware service that performs a particular function can include the software component stored in a computer-readable medium in connection with the necessary hardware components, such as processor 910, connection 905, output device 935, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration). Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative aspects of the disclosure include:

Aspect 1. A method of validating one or more requests, the method comprising: receiving message data from a first device accessible to a user, wherein the message data is associated with a message to be sent using the first device; sending, to a second device accessible to the user, a request for confirmation that the user requested a digital signature for the message, the first device and second device being different devices; receiving a confirmation from the second device, the confirmation confirming that the user requested the digital signature for the message; generating the digital signature for the message using the message data and a private key; and sending the digital signature to the first device.

Aspect 2. The method of Aspect 1, wherein the request for confirmation includes information associated with the message.

Aspect 3. The method of Aspect 2, wherein the information associated with the message includes at least one of a timestamp corresponding to a time associated with sending of the message, a portion of text included in the message, and an intended recipient of the message.

Aspect 4. The method of any of Aspects 1 to 3, wherein the private key is an asymmetric private key.

Aspect 5. The method of any of Aspects 1 to 4 wherein generating the digital signature is performed using a Rivest-Shamir-Adleman (RSA) algorithm.

Aspect 6. The method of any of Aspects 1 to 5, wherein the message data includes a hash of the message.

Aspect 7. The method of any of Aspects 1 to 6, wherein the message is an email.

Aspect 8. The method of Aspect 7, wherein the first device is communicatively coupled to an email messaging system.

Aspect 9. The method of any of Aspects 1 to 8, further comprising: receiving additional message data from the first device, wherein the additional message data is associated with an additional message to be sent using the first device; sending, to the second device accessible to the user, an additional request for confirmation that the user requested an additional digital signature for the additional message;

receiving, from the second device, an indication that the user did not authorize the additional message; and in response to receiving the indication that the user did not authorize the additional message, not generating an additional digital signature for the additional message.

Aspect 10. The method of any of Aspects 1 to 9, further comprising: signing the message data using the private key; and sending the signed message data to the first device.

Aspect 11. The method of any of Aspects 1 to 10, wherein the signed message includes coded information for authenticating the signed message.

Aspect 12. The method of Aspect 11, wherein the coded information includes a quick response (QR) code.

Aspect 13. An apparatus for validating one or more requests, the apparatus comprising: one or more processors; one or more non-transitory machine-readable storage media containing instructions which when executed on the one or more processors, cause the one or more processors to perform operations including: receiving message data from a first device accessible to a user, wherein the message data is associated with a message to be sent using the first device; sending, to a second device accessible to the user, a request for confirmation that the user requested a digital signature for the message, the first device and second device being different devices; receiving a confirmation from the second device, the confirmation confirming that the user requested the digital signature for the message; generating the digital signature for the message using the message data and a private key; and sending the digital signature to the first device.

Aspect 14. The apparatus of Aspect 13, wherein the request for confirmation includes information associated with the message.

Aspect 15. The apparatus of Aspect 14, wherein the information associated with the message includes at least one of a timestamp corresponding to a time associated with sending of the message, a portion of text included in the message, and an intended recipient of the message.

Aspect 16. The apparatus of any of Aspects 13 to 15, wherein the private key is an asymmetric private key.

Aspect 17. The apparatus of any of Aspects 13 to 16, wherein generating the digital signature is performed using a Rivest-Shamir-Adleman (RSA) algorithm.

Aspect 18. The apparatus of any of Aspects 13 to 17, wherein the message data includes a hash of the message.

Aspect 19. The apparatus of any of Aspects 13 to 18, wherein the message is an email.

Aspect 20. The apparatus of Aspect 19, wherein the first device is communicatively coupled to an email messaging system.

Aspect 21. The apparatus of any of Aspects 13 to 20, wherein the operations further comprise: receiving additional message data from the first device, wherein the additional message data is associated with an additional message to be sent using the first device; sending, to the second device accessible to the user, an additional request for confirmation that the user requested an additional digital signature for the additional message; receiving, from the second device, an indication that the user did not authorize the additional message; and in response to receiving the indication that the user did not authorize the additional message, not generating an additional digital signature for the additional message.

Aspect 22. The apparatus of any of Aspects 13 to 21, wherein the operations further comprise: signing the message data using the private key; and sending the signed message data to the first device.

Aspect 23. The apparatus of any of Aspects 13 to 22, wherein the signed message includes coded information for authenticating the signed message.

Aspect 24. The apparatus of Aspect 23, wherein the coded information includes a quick response (QR) code.

Aspect 25. A computer-readable storage medium storing instructions that, when executed, cause one or more processors to perform any of the operations of Aspects 1 to 24.

Aspect 26. An apparatus comprising one or more means for performing any of the operations of Aspects 1 to 24.

Aspect 27. A method of validating one or more requests, the method comprising: sending, by a first device, first message data to a server, wherein the first message data is associated with a first message to be sent by the first device to a recipient device; receiving, by the first device from the server, a first digital signature for the first message; associating the first digital signature to the first message; and addressing, by the first device, the first message and the first digital signature to the recipient device.

Aspect 28. The method of Aspect 27, wherein the first digital signature is generated using the first message data and a private key for the server.

Aspect 29. The method of any of Aspects 27 or 28, wherein the first message data includes a hash of the first message.

Aspect 30. The method of any of Aspects 27 to 29, wherein the first message is an email.

Aspect 31. The method of any of Aspects 27 to 30, further comprising: receiving, from a sender device, a second message that includes a second digital signature, the second message being associated with second message data; and determining whether the second digital signature is valid using a public key for the server.

Aspect 32. The method of Aspect 31, further comprising: determining that the second digital signature is valid using the public key; in response to determining that the second digital signature is valid, generating an indication that the second digital signature is valid; and outputting the indication.

Aspect 33. The method of Aspect 32, wherein outputting the indication includes displaying the indication.

Aspect 34. The method of Aspect 31, further comprising: determining that the second digital signature is not valid using the public key; in response to determining that the second digital signature is not valid, generating an indication that the second digital signature is not valid; and outputting the indication.

Aspect 35. The method of Aspect 34, wherein outputting the indication includes displaying the indication.

Aspect 36. The method of any of Aspects 31 to 35, wherein the second digital signature is generated using the second message data and a private key for the server.

Aspect 37. An apparatus of validating one or more requests, the apparatus comprising: one or more processors; one or more non-transitory machine-readable storage media containing instructions which when executed on the one or more processors, cause the one or more processors to perform operations including: sending first message data to a server, wherein the first message data is associated with a first message to be sent to a recipient device; receiving, from the server, a first digital signature for the first message; associating the first digital signature to the first message; and addressing the first message and the first digital signature to the recipient device.

Aspect 38. The apparatus of Aspect 38, wherein the first digital signature is generated using the first message data and a private key for the server.

Aspect 39. The apparatus of any of Aspects 37 or 38, wherein the first message data includes a hash of the first message.

Aspect 40. The apparatus of any of Aspects 37 to 39, wherein the first message is an email.

Aspect 41. The apparatus of any of Aspects 37 to 40, wherein the operations further comprise: receiving, from a sender device, a second message that includes a second digital signature, the second message being associated with second message data; and determining whether the second digital signature is valid using a public key for the server.

Aspect 42. The apparatus of Aspect 41, wherein the operations further comprise: determining that the second digital signature is valid using the public key; in response to determining that the second digital signature is valid, generating an indication that the second digital signature is valid; and outputting the indication.

Aspect 43. The apparatus of Aspect 42, wherein outputting the indication includes displaying the indication.

Aspect 44. The apparatus of Aspect 41, wherein the operations further comprise: determining that the second digital signature is not valid using the public key; in response to determining that the second digital signature is not valid, generating an indication that the second digital signature is not valid; and outputting the indication.

Aspect 45. The apparatus of Aspect 44, wherein outputting the indication includes displaying the indication.

Aspect 46. The apparatus of any of Aspects 41 to 45, wherein the second digital signature is generated using the second message data and a private key for the server.

Aspect 47. A computer-readable storage medium storing instructions that, when executed, cause one or more processors to perform any of the operations of Aspects 27 to 46.

Aspect 48. An apparatus comprising one or more means for performing any of the operations of Aspects 27 to 46.

What is claimed is:

1. A method of validating one or more requests, the method comprising:
   receiving message data from a first device accessible to a user, wherein the message data is associated with a message to be sent using the first device;
   sending, to a second device accessible to the user, a request for confirmation that the user requested a digital signature for the message, the first device and second device being different devices;
   receiving a confirmation from the second device, the confirmation confirming that the user requested the digital signature for the message;
   generating the digital signature for the message using the message data and a private key;
   sending the digital signature to the first device for transmission of the message with the digital signature for verification of the message to a recipient device;
   signing the message data using the private key, wherein the signed message data includes coded information for authenticating the signed message data; and
   sending the signed message data to the first device.

2. The method of claim 1, wherein the request for confirmation includes information associated with the message.

3. The method of claim 2, wherein the information associated with the message includes at least one of a timestamp corresponding to a time associated with sending of the message, a portion of text included in the message, and an intended recipient of the message.

4. The method of claim 1, wherein the private key is an asymmetric private key.

5. The method of claim 1, wherein generating the digital signature is performed using a Rivest-Shamir-Adleman (RSA) algorithm.

6. The method of claim 1, wherein the message data includes a hash of the message.

7. The method of claim 1, wherein the message is an email.

8. The method of claim 7, wherein the first device is communicatively coupled to an email messaging system.

9. The method of claim 1, further comprising:
   receiving additional message data from the first device, wherein the additional message data is associated with an additional message to be sent using the first device;
   sending, to the second device accessible to the user, an additional request for confirmation that the user requested an additional digital signature for the additional message;
   receiving, from the second device, an indication that the user did not authorize the additional message; and
   in response to receiving the indication that the user did not authorize the additional message, not generating an additional digital signature for the additional message.

10. The method of claim 1, wherein the coded information includes a quick response (QR) code.

11. An apparatus for validating one or more requests, the apparatus comprising:
   one or more processors; and
   one or more non-transitory machine-readable storage media containing instructions which when executed on the one or more processors, cause the one or more processors to perform operations including:
      receiving message data from a first device accessible to a user, wherein the message data is associated with a message to be sent using the first device;
      sending, to a second device accessible to the user, a request for confirmation that the user requested a digital signature for the message, the first device and second device being different devices;
      receiving a confirmation from the second device, the confirmation confirming that the user requested the digital signature for the message;
      generating the digital signature for the message using the message data and a private key;
      sending the digital signature to the first device for transmission of the message with the digital signature for verification of the message to a recipient device;
      signing the message data using the private key, wherein the signed message data includes coded information for authenticating the signed message data; and
      sending the signed message data to the first device.

12. The apparatus of claim 11, wherein the request for confirmation includes information associated with the message, the information associated with the message including at least one of a timestamp corresponding to a time associated with sending of the message, a portion of text included in the message, and an intended recipient of the message.

13. The apparatus of claim 11, wherein the message data includes a hash of the message.

14. The apparatus of claim 11, wherein the message is an email, and wherein the first device is communicatively coupled to an email messaging system.

15. The apparatus of claim 11, wherein the operations further comprise:
   receiving additional message data from the first device, wherein the additional message data is associated with an additional message to be sent using the first device;

sending, to the second device accessible to the user, an additional request for confirmation that the user requested an additional digital signature for the additional message;

receiving, from the second device, an indication that the user did not authorize the additional message; and in response to receiving the indication that the user did not authorize the additional message, not generating an additional digital signature for the additional message.

16. The apparatus of claim 11, wherein the signed message data includes coded information for authenticating the signed message data.

17. A non-transitory computer-readable storage medium storing instructions that, when executed, cause one or more processors to:

receive message data from a first device accessible to a user, wherein the message data is associated with a message to be sent using the first device;

send, to a second device accessible to the user, a request for confirmation that the user requested a digital signature for the message, the first device and second device being different devices;

receive a confirmation from the second device, the confirmation confirming that the user requested the digital signature for the message;

generate the digital signature for the message using the message data and a private key;

send the digital signature to the first device for transmission of the message with the digital signature for verification of the message to a recipient device;

sign the message data using the private key, wherein the signed message data includes coded information for authenticating the signed message data; and send the signed message data to the first device.

* * * * *